United States Patent Office 3,161,220
Patented Dec. 15, 1964

3,161,220
PNEUMATIC VEHICLE TIRE
Richard Beckadolph, Hannover, Germany, assignor to Continental Gummi-Werke Aktiengesellschaft, Hannover, Germany
Filed Sept. 29, 1961, Ser. No. 144,090
Claims priority, application Germany, Oct. 1, 1960, C 22,456
2 Claims. (Cl. 152—356)

The present invention relates to a pneumatic vehicle tire with a layer of parallel threads, cords or the like which form the carcass. The said layer extends from bead to bead and is folded therearound and passed to the zenith portion of the tire in such a way that the free ends of the layer overlap in a range the width of which substantially corresponds to the width of the tread surface. The present invention also comprises such tires of the type involved in which, between the free overlapping end portions of the carcass layer there is arranged an annular cord fabric layer known per se, which likewise extends over the width of the tread strip.

It is known so to design the cord fabric layer arranged between the free ends that the threads being formed extend at a right angle with regard to the circumferential direction of the tire. In this connection, there exists the danger that the increase in length of the interposed cord fabric, which increase is required during the shaping of the tires, does not occur in a proper manner so that it is not assured that the transversely extending threads will, following the shaping portion, have a uniform distance from each other.

It is, therefore, an object of the present invention to provide a vehicle tire, which will overcome the above-mentioned drawbacks.

It is another object of this invention to provide a pneumatic tire which will be characterized by an advantageous symmetric cross-binding or bandage in the zenith portion of the tire, whereby a desirable reinforcement of the tire in the zenith portion will be obtained.

It is a further object of this invention to provide a pneumatic vehicle tire as set forth in the preceding paragraphs, which will have flexible and soft side walls.

These and other objects and advantages of the invention will appear more clearly from the following specification in connection with the accompanying drawing, in which.

Figure 1:
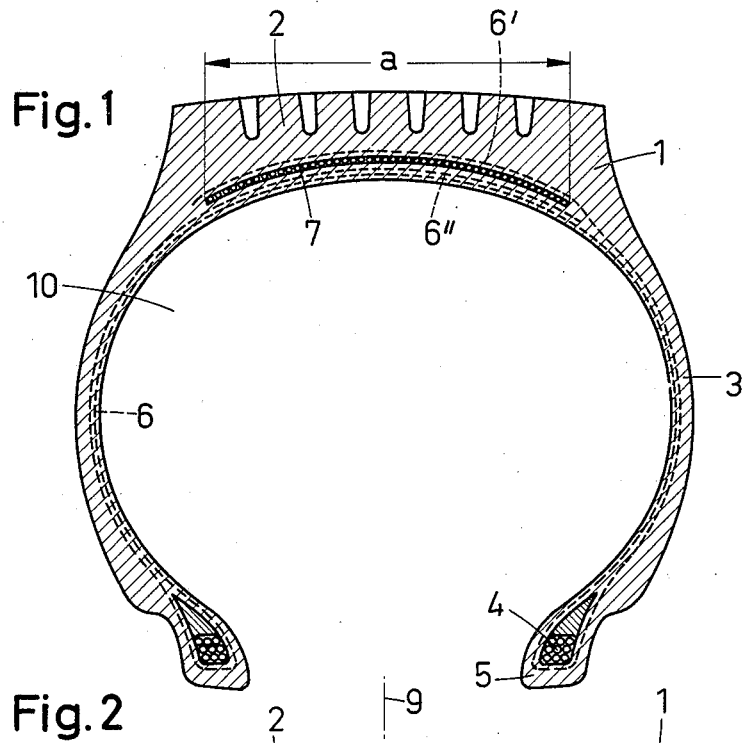
FIGURE 1 is a partial section through a pneumatic vehicle tire.

In contrast to the above-mentioned heretofore known tires, according to the present invention, the direction of the threads, cords or the like forming the cord fabric layer corresponds to the direction which the threads of the uninterrupted, from bead-to-bead extending portion of the carcass layer confined with the circumferential direction of the tire. With a tire of the mentioned type, a cord fabric web is employed for the carcass which cord fabric web has threads or the like extending at an incline with regard to the circumferential direction of the tire. Thus, the threads of the carcass portion extending in uninterrupted manner from bead to bead extend in an inclined direction, whereas those ends of this carcass layer which lead up to the zenith portion will, due to the lapping around the bead cores, confine an oppositely directed and inclined direction with the circumferential direction of the tire. Thus, the tire zenith portion has two layer sections with threads in one inclined direction, whereas another layer section or portion has threads which are embedded in an oppositely inclined direction.

Inasmuch as according to the invention, between the overlapping free ends of the carcass layer, there are arranged threads or the like the direction of which coincides with the thread direction of the carcass layer portion, which passes in uninterrupted manner from bead to bear, an advantageous symmetric cross-binding is obtained in the tire zenith portion. This cross-binding or cross-bracing composed of four layers will, without difficulty, permit the forming or lapping of the raw tire without bringing about the danger that changes in the location of the individual threads might occur. Moreover, due to the four layer cross-binding, a desirable reinforcement in the zenith portion of the tire will be obtained, which will, for all practical purposes, prevent undesirable deformations of the tread strip. The tire side walls, on the other hand, are relatively soft and flexible so that a soft cushioning of the tire body will be possible by corresponding deformation of its side walls.

All of these features can be obtained in a simple manner by means of two cord fabric strips of different width of which one strip forms the carcass layer with the overlapping ends and the other forms the reinforcing strip between said ends.

The reinforcement and the stiffening of the zenith portion of the tire can furthermore be improved if the cord strip to be interposed between the free ends of the carcass layer is provided with a rubber substance or is embedded in a rubber layer which is harder than the rubberization for the threads or the like of the carcass layer or the rubber envelopes therefor. The difference in the degree of hardness is intended to amount from approximately 8 to 20 shore grades A. It is possible to increase the number of layers for the reinforcing inserts embedded in the tire, for instance, by doubling. A particularly effective and simple arrangement is, however, obtained when the carcass layer and also the additional reinforcing insert layer are designed as individual layers in the tire zenith portion.

Referring now to the drawing in detail, the tire body 1 consisting of rubber or rubber-like material is provided with a tread strip 2, flexible side walls 3 and annular bead cores 4 composed of steel wires and located in the tire feet or beads 5. Embedded in said tire body are two cord fabric layers 6 and 7 with pull resistant threads 8 which are all embedded in the tire body 1 and extend in a direction inclined to the circumferential direction of the tire.

The cord fabric layer 6 is in that portion of the tire body 1 which faces the tire hollow chamber 10, i.e. on the inside, passed in an uninterrupted manner from one bead core 4 to the other bead core 4, whereas the end portions 6' and 6" of the cord fabric layer 6 are passed through the tire side walls 3 upwardly in the direction toward the tread strip 2. The end portions 6' and 6" overlap each other within a range the width of which substantially corresponds to the width of the tread strip 2. In the overlapping range $a$ of the end portions 6' and 6", between said end portions there is embedded a cord fabric strip 7 which extends over the tire circumference so that with regard to the range $a$ a total of four cord fabric layers are provided, whereas the tire side walls have only two superimposed fabric layers.

The cord fabric layer 6 and the cord fabric strip 7 thus form the desired reinforcement of the tire below the tread strip 2.

In view of the above-mentioned placement and arrangement of the cord fabric layer 6, a special fabric layer is obtained. Within the section $a$, the threads 8 of that section of the cord fabric layer 6 which face the air chamber 10 extend in one inclined direction, i.e. at an angle alpha, whereas the end portions 6' and 6" have threads 8 with oppositely located inclined direction.

Figure 2:
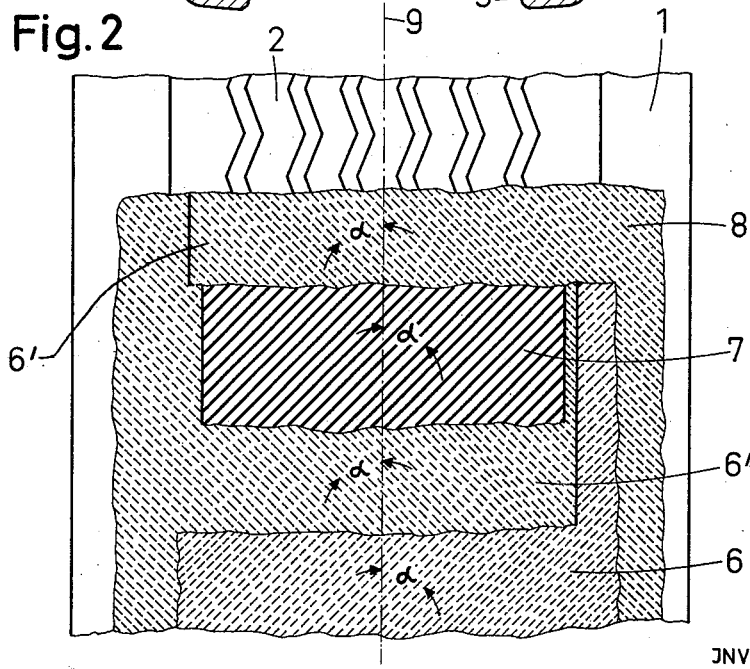
FIGURE 2 is a top view upon the tread surface of the tire according to FIGURE 1, partially in section while showing the reinforcement in the tire.

These threads, however, likewise extend at the angle alpha with regard to the tire circumferential direction 9. In order, under these conditions, to obtain a cross-binding or cross-bracing composed of four layers, the threads 8 of strip 7 are so spaced that their threads extend in the same inclined direction as the threads 8 of that portion of layer 6 which faces the air chamber 10. FIGURE 2 clearly shows the symmetric placement of the threads 8.

It is, of course, to be understood that the present invention is, by no means, limited to the particular construction shown in the drawings, but also comprises any modifications within the scope of the appended claims.

It is furthermore to be understood that the term "thread means" as it appears in the claims is intended to cover threads, cords, wires and the like.

What I claim is:

1. In a pneumatic tire with a tread strip and bead cores: a carcass layer extending in a continuous manner around said bead cores and having two end portions arranged in spaced overlapping relationship to each other in the zenith portion of said tire below said tread strip, said overlapping end portions extending over a width corresponding nearly to the width of said tread strip, said carcass layer comprising thread means inclined at substantially one and the same acute angle with regard to the circumferential direction of said tire, and an annular cord fabric layer interposed between said overlapping end portions while extending over a width substantially the width of said tread strip and having thread means likewise inclined at an acute angle with regard to said circumferential direction of said tire, the thread means of said carcass end portions and the thread means of said cord fabric layer being inclined with regard to said circumferential direction of said tire in such a way that the thread means of said cord fabric layer are inversely inclined with regard to the directly adjacent thread means of said carcass layer end portions, the acute angle formed by said thread means of said fabric layer with said circumferential direction of said tire substantially equalling the acute angle formed by the thread means of said carcass layer end portions with said circumferential direction of said tire.

2. A pneumatic tire according to claim 1, in which the thread means of the carcass layer and said cord fabric layer are respectively embedded in rubber substances, the rubber substances in which the thread means of said cord fabric layer are embedded being considerably harder than the rubber substance in which the thread means of said carcass layer are embedded by from 8 to 20 shore grades A.

References Cited by the Examiner

UNITED STATES PATENTS 2,811,998  11/57  Bourdon _____ 152—361

FOREIGN PATENTS 1,088,973  9/54  France.
554,459  1/57  Italy.

ARTHUR L. LA POINT, *Primary Examiner.*
ROBERT C. RIORDON, *Examiner.*